June 3, 1958 J. V. MURRAY, JR., ET AL 2,837,585
SEPARATION OF AROMATICS AND ALIPHATICS
USING ALKYLENE CARBONATE
Filed Feb. 23, 1954 7 Sheets-Sheet 1

INVENTORS
JAMES V. MURRAY, JR.
CHARLES H. YOUNG
JOHN R. ANDERSON
BY Louis C. Smith Jr.
ATTORNEY June 3, 1958 J. V. MURRAY, JR., ET AL 2,837,585

SEPARATION OF AROMATICS AND ALIPHATICS USING ALKYLENE CARBONATE

Filed Feb. 23, 1954 7 Sheets-Sheet 2

INVENTORS
JAMES V. MURRAY, JR.
CHARLES H. YOUNG
JOHN R. ANDERSON
BY
Louis C. Smith, Jr.
ATTORNEY INVENTORS
JAMES V. MURRAY, JR.
CHARLES H. YOUNG
JOHN R. ANDERSON
BY
Louis C. Smith Jr.
ATTORNEY INVENTORS
JAMES V. MURRAY, JR.
CHARLES H. YOUNG
JOHN R. ANDERSON
BY Louis C. Smith Jr.
ATTORNEY INVENTORS
JAMES V. MURRAY, JR.
CHARLES H. YOUNG
JOHN R. ANDERSON
BY Louis C. Smith Jr.
ATTORNEY INVENTORS
JAMES V. MURRAY, JR.
CHARLES H. YOUNG
JOHN R. ANDERSON
BY Louis C. Smith Jr.
ATTORNEY June 3, 1958 J. V. MURRAY, JR., ET AL 2,837,585

SEPARATION OF AROMATICS AND ALIPHATICS USING ALKYLENE CARBONATE

Filed Feb. 23, 1954 7 Sheets-Sheet 7

INVENTORS
JAMES V. MURRAY, JR
CHARLES H. YOUNG
JOHN R. ANDERSON

BY Louis C. Smith, Jr.
ATTORNEY

United States Patent Office 2,837,585

Patented June 3, 1958

2,837,585

SEPARATION OF AROMATICS AND ALIPHATICS USING ALKYLENE CARBONATE

James V. Murray, Jr., South Charleston, Charles H. Young, Charleston, and John R. Anderson, St. Albans, W. Va., assignors to Union Carbide Corporation, a corporation of New York Application February 23, 1954, Serial No. 411,922

7 Claims. (Cl. 260—674)

Figure 1:
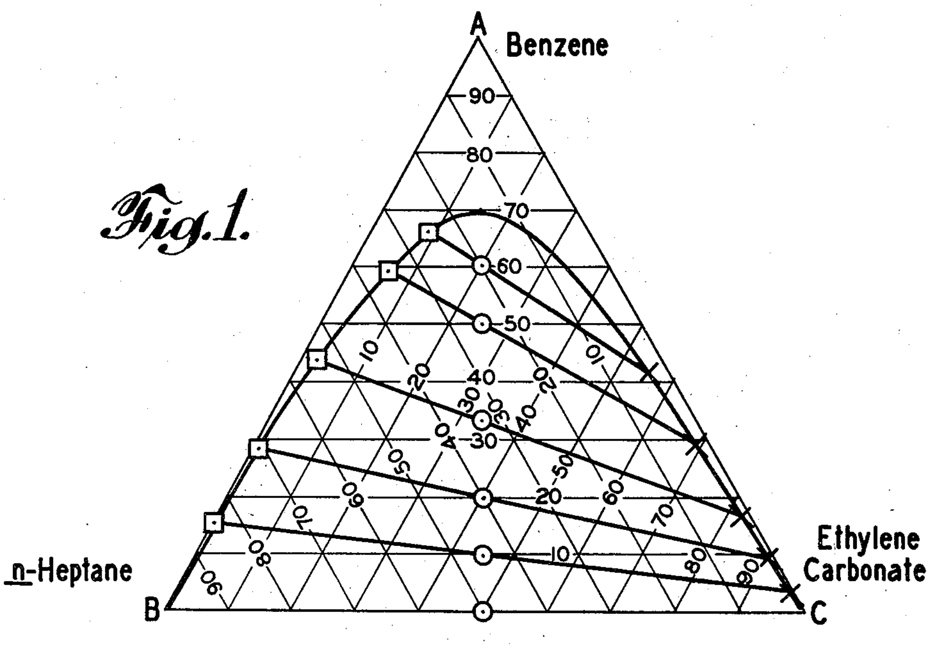
Figure 2:
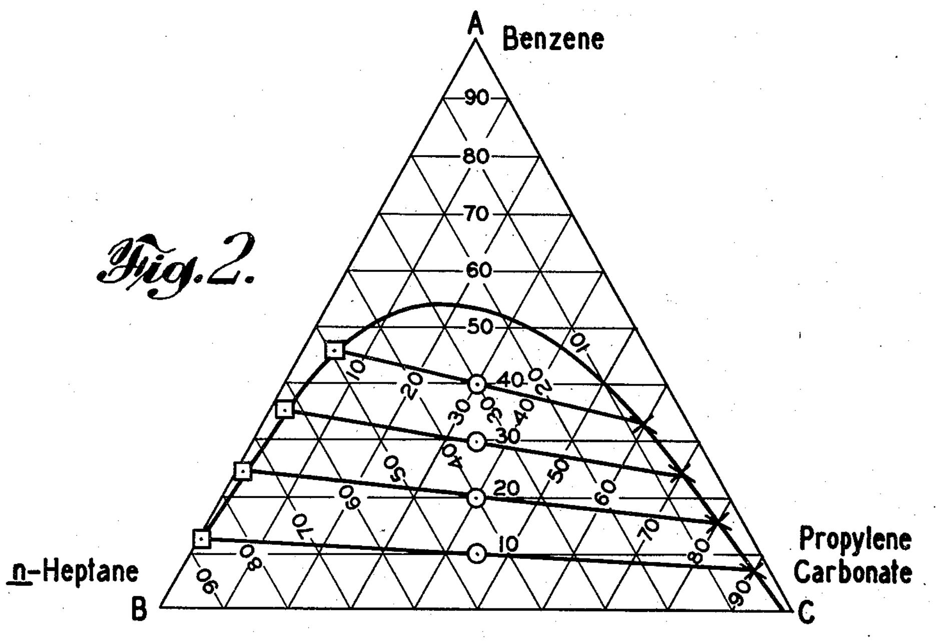
Figure 3:
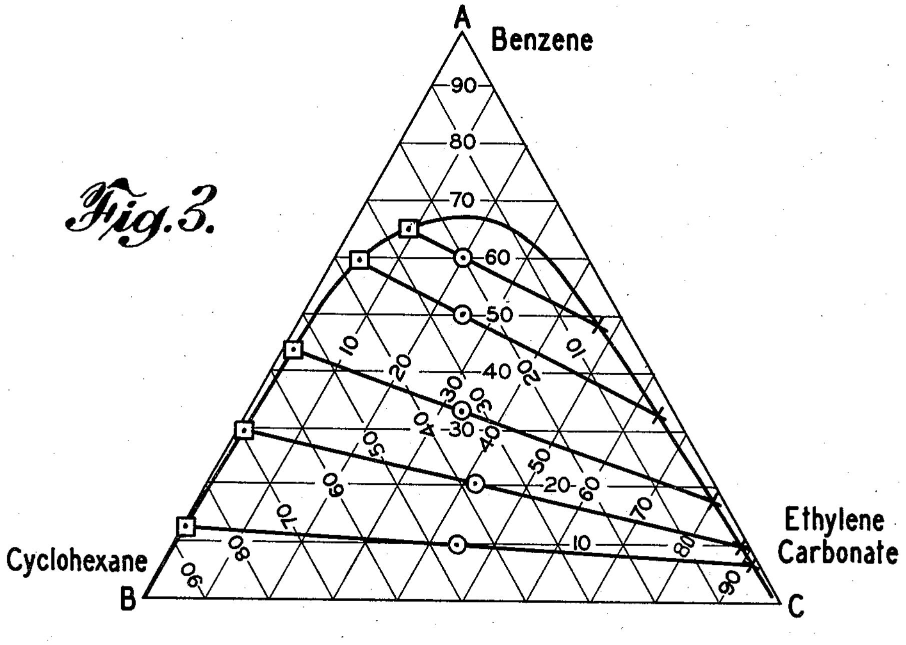
Figure 4:
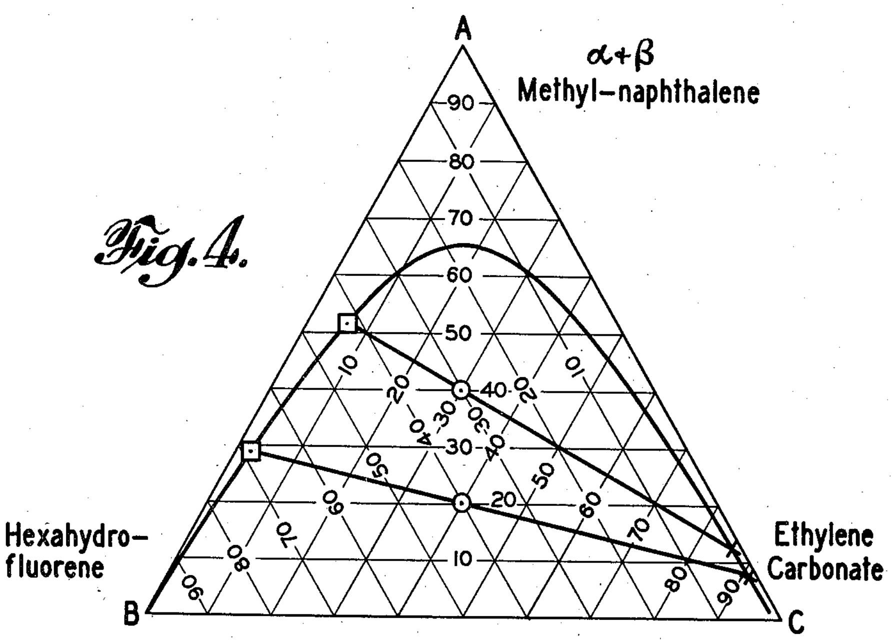
Figure 5:
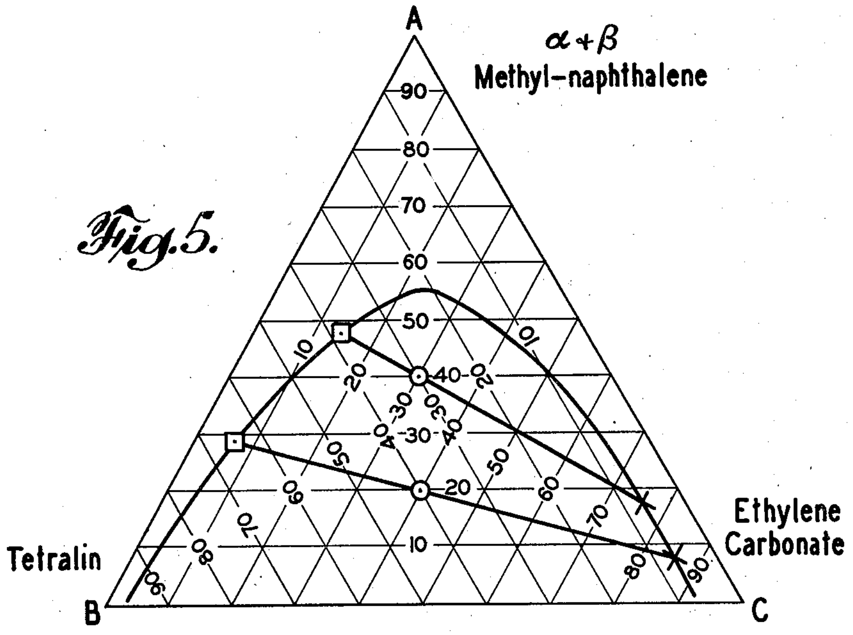
Figure 6:
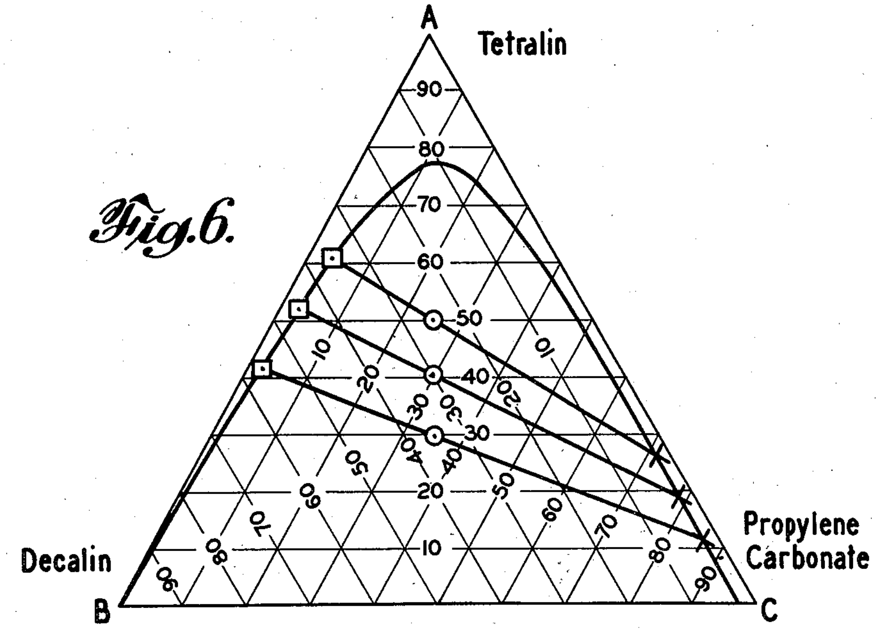
Figure 7:
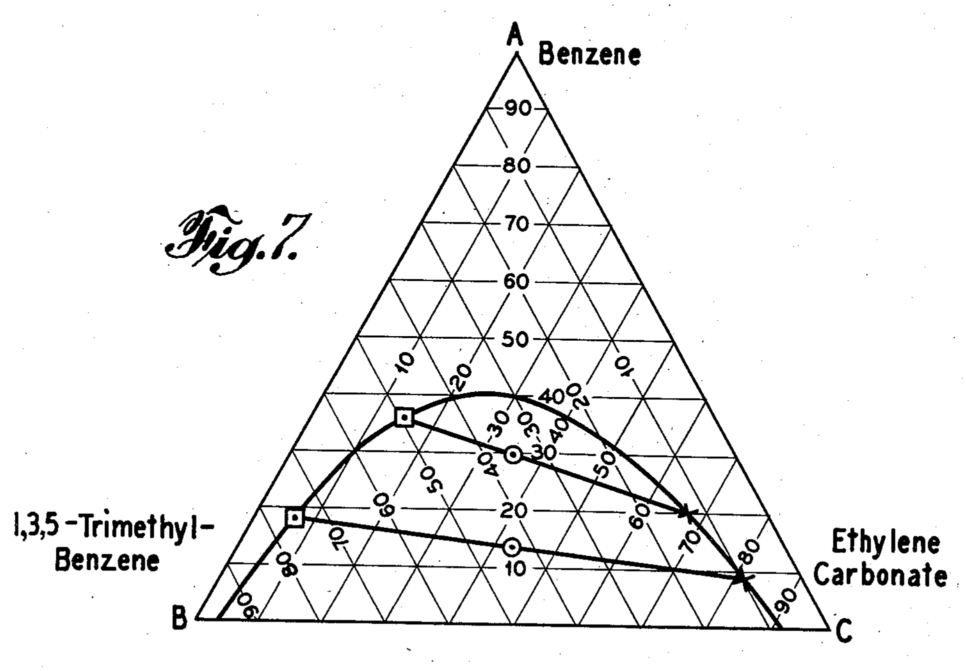
Figure 8:
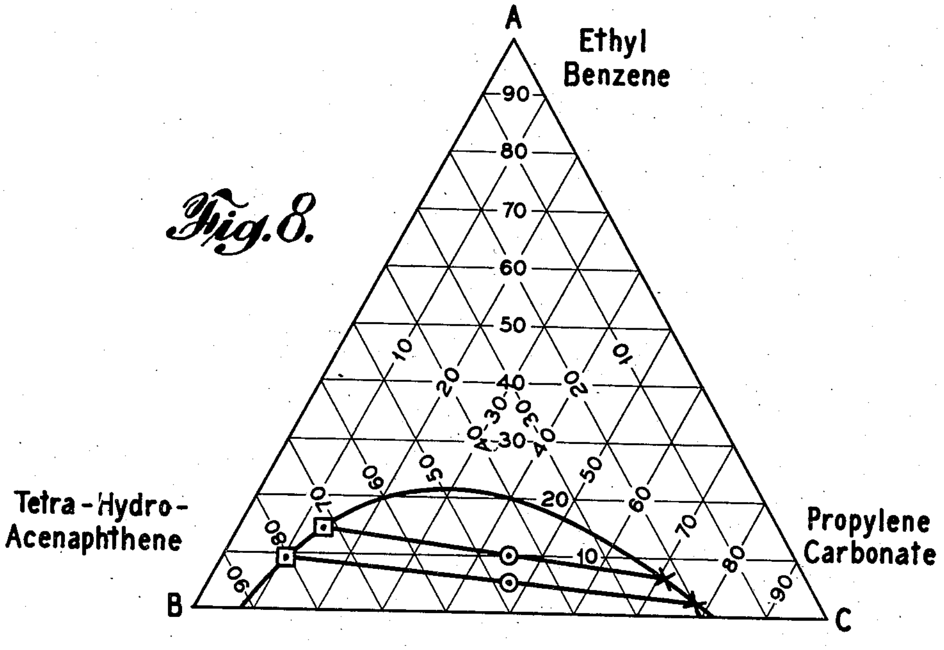

This invention relates to a method for separating hydrocarbon mixtures. More specifically the invention relates to a method involving the use of alkylene carbonates for accomplishing such a separation.

The invention is particularly applicable to the separation of hydrocarbon mixtures containing benzene homologs, naphthalene homologs and nonaromatic hydrocarbons. Mixtures of these hydrocarbons occur in many natural materials and in the products of industrial processes. The distillation of oil from the hydrogenation of coal may yield mixtures of all three, as may the distillation of some fractions of crude petroleum oil. The cracking products of these processes is yet another source. The effective utilization of such product mixtures requires usually that the naphthalene homologs, the benzene homologs and the nonaromatic hydrocarbons be separated out.

Usually such basic separations cannot be accomplished by conventional fractional distillation because of azeotropic phenomena between certain of the substances, or because of closeness of boiling points, or for both reasons. Numerous reasons, including the relative ease and efficiency with which liquids can be handled, make it highly desirable to effect such a separation by the use of selective liquid solvents. Thus liquid sulphur dioxide extraction processes, despite the undesirable features of sulphur dioxide, have found prominent use in the separation of aromatics from nonaromatics, especially in petroleum technology. The present invention is directed to providing an efficient liquid separation process for hydrocarbon mixtures which not only does not have the attendant disadvantages of earlier methods, but has distinct advantages of its own, as will be seen. When a basic separation had been made, the conventional separation techniques such as distillation can be effectively employed for more detailed separations.

A primary object of this invention is to provide an efficient process for separating complex hydrocarbon mixtures into three different groups or fractions, said fractions being distinguished from one another by the extent to which the compounds therein possess the properties of aromatic, as opposed to aliphatic, compounds. A further object of the invention is to provide a method whereby any one of these three fractions may be removed from a hydrocarbon mixture. Still another object of the invention is to provide means for separating individual compounds or groups of compounds of one fraction from individual compounds or groups of compounds of one or both of the other two fractions. Yet another object of the invention is to provide a method employing solvents which may be readily and economically recovered after such a separation is accomplished. Other objects of the invention will be apparent from the description which follows.

We have discovered a method whereby the above objects may be achieved and other advantages had, as will be shown below, through the employment of ethylene carbonate and propylene carbonate as selective solvents.

Figure 9:
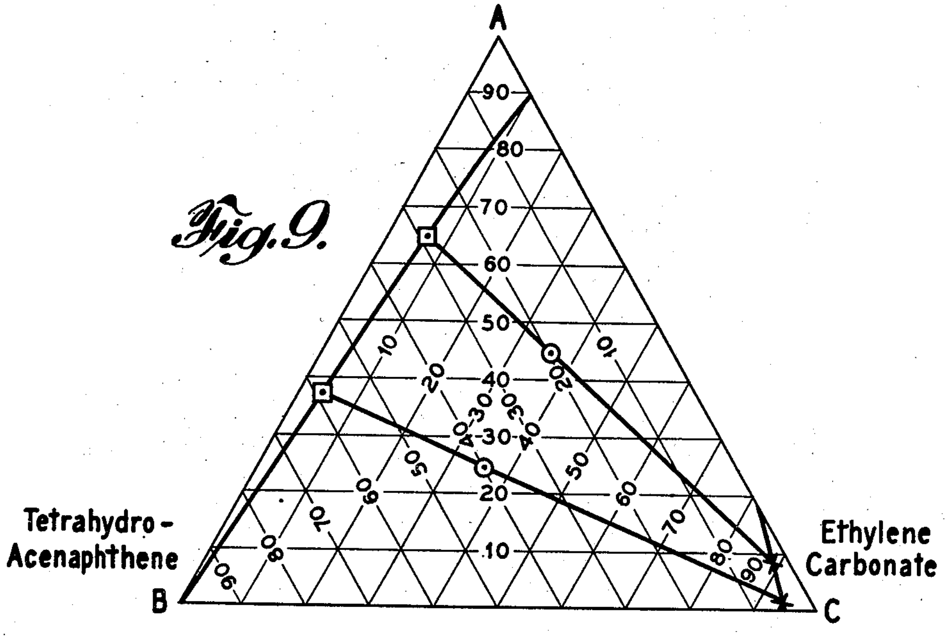
Figure 10:
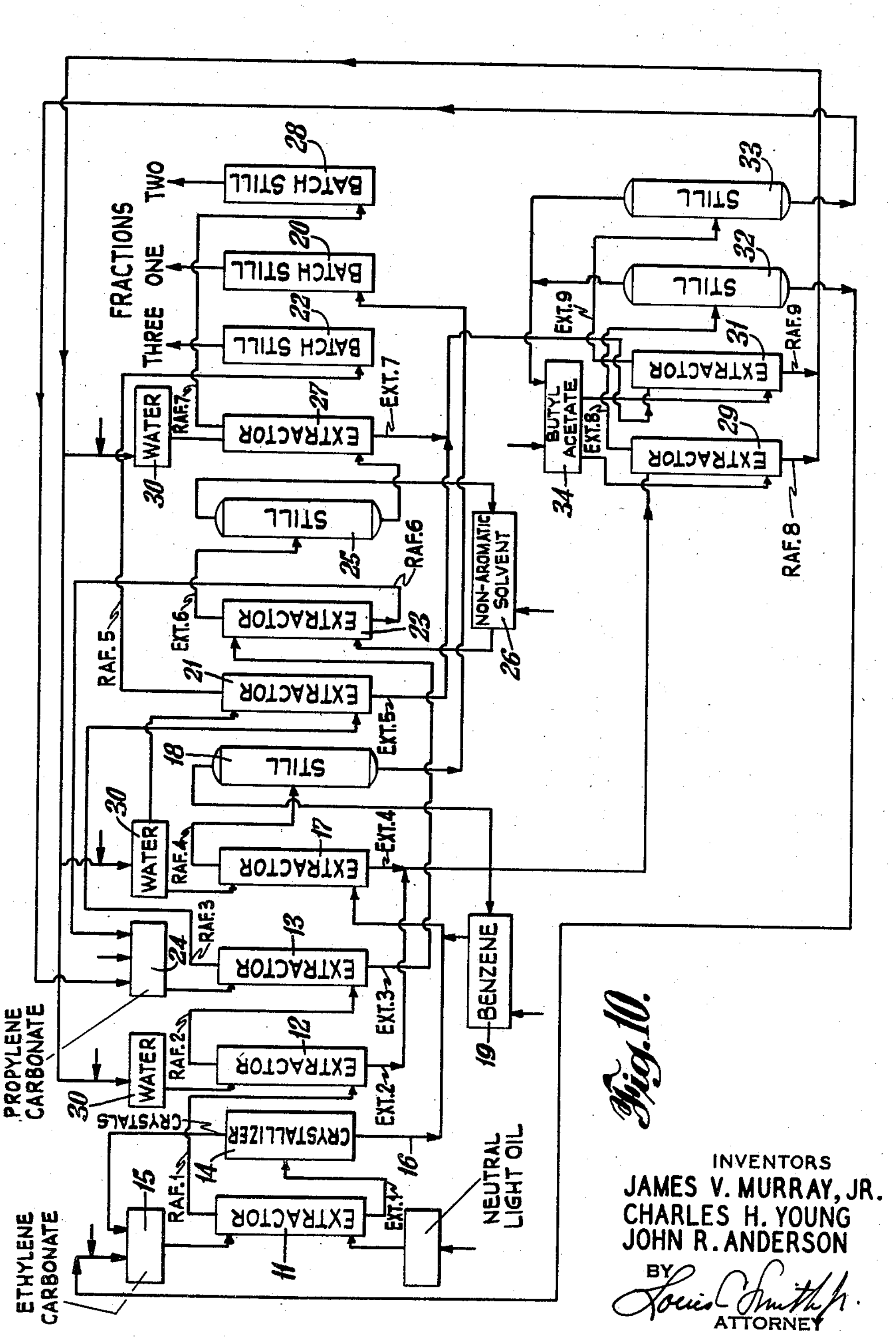

In the drawings, Figures 1 through 9 are miscibility diagrams showing data for Examples I through IX, respectively; Figure 10 is a diagrammatic flow sheet for Example X; and Figures 11 through 14 are graphs of distillation curves for Example X.

As stated above, the method of our invention separates complex hydrocarbon mixtures into three fractions. The compounds separated out in particular fractions will vary to some extent with the conditions, particularly of temperature, under which the separation is carried out. This is to be expected in view of the well known effects of temperature upon solubility. Because the melting point of ethylene carbonate requires operating above a temperature of 36° C., Fraction one, as herein designated, will comprise benzene and its homologs averaging less than two alkyl carbon atoms per benzene ring, naphthalene and those alkyl homologs of naphthalene boiling below 300° C. Substantially higher operating temperatures, however, may cause benzene homologs of a slightly higher degree of alkylation than one alkyl carbon atom per benzene ring, such as dimethylbenzene or ethylbenzene, to be separated out as part of Fraction one. In general, there is no liquid-liquid immiscibility between the compounds of Fraction one and either ethylene carbonate or propylene carbonate.

Fraction two, at the preferred operating conditions later defined, will include benzene homologs averaging at least two alkyl carbon atoms per benzene ring but not more than four alkyl or not more than a total of five alkyl and cycloalkyl carbon atoms per benzene, and alkyl substituted naphthalene homologs boiling above 300° C. At substantially higher temperatures, Fraction two may no longer include those compounds of which the degree of alkylation is just above one alkyl carbon atom per benzene ring, which are described above as being in Fraction one at such temperatures, but may additionally include benzene homologs having a slightly higher degree of alkylation than those described immediately above as being normally in Fraction two. In general, the compounds comprising Fraction two at a particular operating temperature are at that temperature completely miscible with propylene carbonate but not with ethylene carbonate. However, while the compounds of Fraction two are generally immiscible with ethylene carbonate, they are generally more soluble in ethylene carbonate than the compounds of Fraction three.

Fraction three comprises the nonaromatic hydrocarbons, both aliphatic and cycloaliphatic, and the homologs of benzene having a higher degree of alkylation than those found in Fraction two at normal operating temperatures. As shown in the previous paragraph, however, some compounds which would normally be in Fraction three will be found in Fraction two when the separation is carried out at higher temperatures. Unlike either of the other two fractions, the compounds of Fraction three are not completely miscible with either ethylene carbonate or propylene carbonate.

The method of the invention thus comprises mixing together in a vessel the preferred solvent and the hydrocarbon mixture. Though not essential, mechanical aids such as packing, baffles, mixers and the like may be advantageously employed. Temperature and pressure are employed such that two liquid phases but no solid phases are formed. When two phases have formed as a result of the mixing, the phases may be separated by gravity or other means such as centrifugal force. It is usually desirable to employ more than one extraction stage in order to effect substantially complete separation of the desired components. Depending upon the type of separation required and the characteristics of the mixture, however, one extraction may suffice. In some cases, in order to improve the selectivity of the solvent or to insure the formation of a second phase, or both, it may be desirable to add water to the solvent. For example, in one extraction of Fraction one from a complex hydrocarbon mixture, it was found that a 95 percent ethylene carbonate and 5 percent water mixture was more selective than straight ethylene carbonate.

In most separations employing ethylene carbonate as a solvent our preferred range of operating temperatures is from 35 to 50° C., with the lower part of this range being most preferred. When separating certain types of mixtures however, it may be desirable to use higher temperatures. Temperatures up to the temperature of appreciable decomposition of ethylene carbonate, usually about 130 to 140° C., may then be used. When some water is mixed with the ethylene carbonate or is otherwise in the system, lower temperatures should be used to prevent appreciable hydrolysis of the ethylene carbonate. Normally the process is carried out at atmospheric pressure, but if the materials being separated have high vapor pressures, superatmospheric pressures may be necessary.

When propylene carbonate is employed the preferred operating temperature range is from 20 to 60° C., but if desired for particular separations temperatures ranging from the freezing point of proylene carbonate, —49° C., to the decomposition temperature, about 130 to 140° C., may be employed. Pressure requirements are the same as for ethylene carbonate separations, with atmospheric pressure being normally used.

The proportion of solvent to be used for a particular extraction will vary with a number of factors, including the materials being separated, the solvent being used and the temperature at which the extraction is run. Ordinarily, the proportion of solvent to mixture being extracted will be within the range of 20 to 1 and 1 to 20, and it is desirable that the extract contain at least 20 percent by weight of solvent but not more than 95 percent.

The invention may be applied to the separation of a hydrocarbon mixture containing all three fractions in the following manner, as determined by the relative miscibilities given above. The separation is accomplished in two stages. The first stage comprises treating the mixture with ethylene carbonate, which gives an ethylene carbonate extract containing Fraction one and leaves as a raffinate Fractions two and three. This raffinate is then treated with propylene carbonate to give a propylene carbonate extract containing Fraction two and leave as a raffinate Fraction three. This basic separation is illustrated in detail by Example X using the above procedure. However, this is not the only procedure by which this basic separation can be accomplished. The mixture could be treated first with propylene carbonate to extract Fractions one and two, and then this extract, after removal of the propylene carbonate, could be treated with ethylene carbonate to extract Fraction one from it. Also, it is evident that where it is desired to separate a complex hydrocarbon mixture into an essentially aromatic fraction and an essentially nonaromatic fraction, it is possible to use propylene carbonate to extract Fractions one and two from the mixture and leave as raffinate the essentially nonaromatic Fraction three.

Based again on the relative miscibilities given above, the numerous separations possible within the scope of the invention will be apparent to one skilled in the art of liquid-liquid extraction. A number of these separations are illustrated in the examples. It can be seen from Examples I and II that where it is desired to separate one or more compounds of Fraction one from one or more compounds of Fraction three it is generally possible to employ either ethylene carbonate or propylene carbonate as the solvent, though the two are not absolute equivalents in their effectiveness for this separation. Again, from Examples VIII and IX it can be seen also that while propylene carbonate is normally the solvent used to separate mixtures of compounds of Fractions two and three, it is possible and often preferable to employ ethylene carbonate to separate individual compounds of Fraction two from those of Fraction three. The choice of the proper solvent for a particular separation can be readily made by means of simple miscibility tests. Such a choice is readily within the province of one accustomed to working with hydrocarbon mixtures, as are related choices such as the optional use of water to increase the effectiveness of the solvent referred to above. It is conceivable also that within the number of compounds encompassed within the scope of the invention there may be some which in specific separations or at certain temperatures do not follow rigidly the pattern of miscibility of the fraction to which they may belong. Compensations in techniques for any special case however may be readily made by one skilled in the art, without exceeding the scope of the invention.

When a separation has been accomplished by the method of the invention, that is by extracting one or more compounds with a solvent, it is necessary to separate the solvent from the hydrocarbons. Several methods can be employed and the one to be used will be determined by the particular separation which has been made as well as other incidental factors. Possible methods include adding water to decrease the solubility of the hydrocarbons in the solvent, as well as distillation of either the solvent or hydrocarbon. Another method is to crystallize the bulk of the solvent and then add water to the mother liquor for dissolving the remainder. Yet another method consists of back-extracting the hydrocarbons from the carbonate solvent with a secondary solvent which is immiscible with the carbonate solvent. Solvents of this type include nonaromatic hydrocarbons having higher or lower boiling points than the hydrocarbon solute dissolved in the carbonate solvent.

The ethylene and propylene carbonates employed in the process of the invention may be prepared very simply by the reactions of corresponding alkylene oxides with carbon dioxide under suitable conditions, these raw materials being readily available. However, they could, of course, be prepared by any workable method. Both ethylene and propylene carbonate are stable under the conditions required for their use in the invention and are believed to produce no toxicity hazard. They have the added distinct advantage of being easily recovered in substantially pure condition after being employed in the process of the invention.

EXAMPLE I

There was subjected to the process of this invention the six mixtures of benzene and n-heptane whose compositions are shown in columns 2 and 3 and whose numbers are shown in column 1 of Table I. These binary mixtures were respectively mixed thoroughly with the appropriate proportions of ethylene carbonate to give the ternary systems whose compositions are shown under columns 4, 5 and 6 of Table I. The two phases which were formed in each experiment were allowed to settle and were separated by decantation and gravity draining. The process was first carried out at a temperature of 40° C. The compositions of the phases were determined by analysis and are entered in columns 7, 8 and 9 of Table I for the raffinates and columns 10, 11 and 12 for the extracts. Finally, the compositions of the hydrocarbons contained in the phases were determined by analysis after the ethylene carbonate had been separated by extraction in three stages with large proportions of water. These analyses are entered in Table I under columns 13 and 14 for the hydrocarbons from the various raffinate phases, and under columns 15 and 16 for the hydrocarbons from the various extract phases.

The data given in Table I have been transposed and plotted to give the ternary diagram of Figure 1. Table I and Figure 1 are complementary and express the same data in two different forms. In Figure 1 the compositions of the ternary systems (cols. 4, 5 and 6 of Table I) are shown by the circle points, the compositions of the raffinates (cols. 7, 8 and 9 of Figure 1) by the boxed points, and the compositions of the extracts (cols. 10, 11 and 12 of Figure 1) by the points indicated by crosses. Because the height of the equilateral triangle used in Figure 1, as in the ternary diagrams for all the examples, is set at 100 percent composition, the perpendiculars to the three sides from any point inside one of these figures will equal the percentages of the three components respectively in the mixture represented by that point. The apexes of the triangles represent the pure components, respectively, and any point on a side of the triangle represents a binary mixture of the two components marked at the apexes on that side.

Thus, the binary mixture (cols. 2, 3, 13, 14, 15 and 16 of Table I) may be read from the figure with the aid of a straight edge. The composition of binary mixture Number 1 (cols. 2 and 3, Table I) may, for example, be read by finding the point at which a unique straight line crosses the benzene-heptane side of the triangle, said straight line also passing through the circle representing the ternary mixture (cols. 4, 5 and 6, Table I) and the point (at the lower right corner of Figure 1) representing pure ethylene carbonate. Similarly, the composition of the binary mixture of hydrocarbons from the raffinate of mixture Number 1 (cols. 13 and 14, Table 10) will be found to be the crossing point on line AB of a straight line passing through the point representing the composition of the raffinate from mixture Number 1 and the point representing pure ethylene carbonate. Further, the composition of the binary mixture of hydrocarbons from the extract of mixture Number 1 may be found to be the crossing point on line AB of a straight line which also passes through the point representing the composition of the extract from mixture No. 1 and the point representing pure ethylene carbonate.

To provide a complete evaluation of the solvents, the entire binodal curve for the system is presented in the diagrams of this and subsequent examples. The data for continuing the curve beyond the points given in Table I were determined by adding the third component to appropriate two component systems until a second phase appeared in the system. The ternary systems thus prepared are points on the binodal curve. The binodal curves bound the compositions that form two liquid phases and tie-lines are drawn across which are straight lines joining compositions lying within the two-phase regions with the compositions of the two phases that are formed from the original compositions.

This example illustrates the separation of a compound of Fraction one, benzene, from a paraffin compound of Fraction three, heptane, employing ethylene carbonate as the solvent. It shows that very high yields of substantially pure benzene and heptane can be obtained from a mixture of the two, employing a multi-stage extraction with ethylene carbonate. Thus is demonstrated the efficiency of the method of the invention in separating these two fractions.

In the interests of brevity, for the following examples only the ternary diagrams of the type of Figure 1 of Example I are given. All the data of the type given in Table I of Example I can be read from these diagrams in the manner described in Example I.

EXAMPLE II

In this example a mixture of benzene and n-heptane was treated as in Example I except that propylene carbonate was used as the solvent. The proportions of benzene, n-heptane, and propylene carbonate in the ternary mixtures are represented by the circle points on Figure 2 and the compositions of the extracts and raffinates by the crosses and boxed points respectively on Figure 2, in the same manner that similar proportions were shown in Example I. Other compositions and information may be read from Figure 2 in the same way as from Figure 1.

From this example, compared with Example I, it can be seen that propylene carbonate as well as ethylene carbonate is effective for separating a compound of Fraction one from a compound of Fraction three, in this case benzene and n-heptane. While propylene carbonate is efficient as a solvent and substantially pure benzene and heptane are obtained, it can be seen the benzene obtained in Example I is of somewhat greater purity. One skilled in the art could quickly determine this fact by simple solubility tests and be guided accordingly in choosing between the two solvents.

*Table I*

SEPARATION OF BENZENE-HEPTANE MIXTURE WITH ETHYLENE CARBONATE

| Column 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| | Composition in Percentage by Weight | | | | | | | | | | | | | | |
| Mixture Number | Binary Mixture | | Ternary System | | | Raffinate | | | Extract | | | Binary Mixture From— | | | |
| | | | | | | | | | | | | Raffinate | | Extract | |
| | Benz. | Hept. | Benz. | Hept. | Eth. Carb. | Benz. | Hept. | Eth. Carb. | Benz. | Hept. | Eth. Carb. | Benz. | Hept. | Benz. | Hept. |
| 1 | 75.0 | 25.0 | 60.0 | 20.0 | 20.0 | 66.0 | 25.0 | 9.0 | 41.5 | 3.0 | 55.5 | 72.0 | 28.0 | 93.4 | 6.6 |
| 2 | 66.6 | 33.4 | 50.0 | 25.0 | 25.0 | 59.0 | 35.0 | 6.0 | 29.0 | 2.0 | 69.0 | 63.0 | 37.0 | 93.5 | 6.5 |
| 3 | 50.0 | 50.0 | 33.3 | 33.3 | 33.4 | 44.0 | 54.0 | 2.0 | 17.0 | 1.0 | 82.0 | 45.0 | 55.0 | 94.5 | 5.5 |
| 4 | 33.3 | 66.7 | 20.0 | 40.0 | 40.0 | 28.0 | 71.0 | 1.0 | 9.0 | 0.5 | 90.5 | 28.5 | 71.5 | 94.8 | 5.2 |
| 5 | 18.0 | 82.0 | 10.0 | 45.0 | 45.0 | 15.5 | 84.0 | 0.5 | 3.0 | 0.1 | 96.9 | 15.5 | 84.5 | 95.0 | 5.0 |
| 6 | 0 | 100 | 0 | 50.0 | 50.0 | 0 | 99.8 | 0.2 | 0 | 0.2 | 99.8 | 0 | 100 | 0 | 100 |

EXAMPLE III

In this example ethylene carbonate was used to effect a separation between a compound from Fraction one, benzene, and a cycloparaffinic compound from Fraction three, cyclohexane. The procedure was the same as in Examples I and II and the results are similarly represented in the ternary diagram of Figure 3.

EXAMPLE IV

Ethylene carbonate was used to extract compounds of Fraction one, methylnaphthalenes, from a compound of Fraction three, hexahydrofluorene. The extraction was made in the same manner as Example I and the results were plotted as a ternary diagram, Figure 4, corresponding to Figure 1 for Example I.

EXAMPLE V

In this example compounds of Fraction one, methylnaphthalene isomers, were extracted from a compound of Fraction two, tetralin, using ethylene carbonate. The procedure was the same as in Example I and the results are similarly given in Figure 5, a ternary diagram of the same type and read in the same manner as Figure 1 of Example I.

EXAMPLE VI

A binary mixture of a compound of Fraction two, tetralin, and a compound of Fraction three, decalin, were treated with propylene carbonate to effect a separation. The results are shown in the ternary diagram Figure 6, which is similar to and read in the same manner as Figure 1 or Example I. The procedure was the same as in Example I.

EXAMPLE VII

In this example benzene, of Fraction one, was extracted from a binary mixture with 1,3,5-trimethylbenzene, from Fraction two, using ethylene carbonate as the solvent. The procedure was that of Example I and the results are drawn in Figure 7.

EXAMPLE VIII

Propylene carbonate was employed to extract ethylbenzene, normally in Fraction two, from a binary mixture with tetrahydroacenaphthene of Fraction three. It will be seen from the data of Figure 8 that while pure tetrahydroacenaphthene can be obtained with this solvent, the ethylbenzene extract will be only 35 percent pure. The procedure was that of Example I.

EXAMPLE IX

Ethylene carbonate was used in place of propylene carbonate to perform the same extraction as that of Example VIII. Figure 9 shows that 100 percent yield and purity of both compounds may be achieved. Thus, ethylene carbonate would be preferable to the propylene carbonate of Example VIII for this extraction, a choice which would be readily apparent to one skilled in the art.

EXAMPLE X

This example illustrates the treatment of a complex mixture of all three fractions of the hydrocarbons, and the result of a separation into Fractions one, two and three. The example shows further a suitable method of recovering the ethylene and propylene carbonate solvents for reuse. Figure 10 is a schematic flow diagram showing the apparatuses use for the example, and the paths of the materials through the process. In Figure 10, extractors 11, 12, 13, 17, 21, and 23 are 12-stage, 2-inch inside diameter "York-Scheibel" extractor columns; extractors 27, 29, and 31 represent three-stage extractions in separatory funnels; stills 18, 25, 22, 20, and 28 are packed columns with 15 to 20 theoretical plates; stills 32 and 33 are packed columns with 2 to 3 theoretical plates; and the crystallizer 14 is a batch operated, externally cooled, vessel equipped with a mechanical stirrer. Table II gives operating conditions and pertinent analyses and is to read in conjunction with the following step-wise description of the process, which explains Figure 10.

*Step 1.*—The mixture, neutral light oil, is treated with ethylene carbonate in extractor 11, the ethylene carbonate extracting Fraction one and carrying it out as extract 1, while a mixture of Fractions two and three are removed as raffinate 1.

*Step 2.*—Raffinate 1 from step 1, containing Fractions two and three, is washed with water in extractor 12. Any traces of ethylene carbonates present are carried out by the water in extract 2, while a mixture of Fractions two and three leaves as raffinate 2.

*Step 3.*—Raffinate 2 from step 2 is treated with propylene carbonate in extractor 13, the propylene carbonate extracting Fraction two and carrying it out as extract 3, while Fraction three leaves as raffinate 3.

*Step 4.*—Extract 1 from step 1 is crystallized in the crystallizing vessel 14, the ethylene carbonate being precipitated in part as a solid phase which is recycled as solvent to the ethylene carbonate storage reservoir 15 for further use in step 1, while the compounds of Fraction one are concentrated in the mother liquor which is taken from the crystallizer through a line 16 to a point in the line where some benzene or other low-boiling aromatic hydrocarbon is added, and thence to extractor 17.

*Step 5.*—The mixture from step 4 of Fraction one with benzene, containing some ethylene carbonate, is treated with water in extractor 17 to extract ethylene carbonate out as extract 4 while Fraction two, now dissolved in benzene, leaves as raffinate 4.

*Step 6.*—Raffinate 4 from step 5 is separated from the added benzene by distillation in still 18, the benzene being removed as distillate and recycled to the benzene reservoir 19, while Fraction one leaves as a distillation residue.

*Step 7.*—The Fraction one distillation residue from step 6 is fractionally distilled in batch still 20 to further separate the components of Fraction one according to the boiling points of the components.

*Step 8.*—Raffinate 3 from step 3 is extracted with water in extractor 21 to separate any traces of propylene carbonate from Fraction three, the propylene carbonate being removed as extract 5 while Fraction three leaves as raffinate 5.

*Step 9.*—Raffinate 5 from step 8 is fractionally distilled in batch still 22 to further separate the components of Fraction three according to the boiling points of the components.

*Step 10.*—Extract 3 from step 3 is treated with a low boiling nonaromatic solvent in extractor 23, the solvent extracting Fraction two which is carried out as extract 6 while the propylene carbonate leaves as raffinate 6 which is recycled to the propylene carbonate reservoir 24.

*Table II*

OPERATIONAL DATA FOR EXAMPLE VII "NEUTRAL LIGHT OIL" SEPARATION

[In this table E. C. represents ethylene carbonate and P. C. represents propylene carbonate.]

| Step No. | Volume Feed/ Volume Solvent | Temp., ° C. | Laboratory Analytical Results— Percent of E.C. or P.C. | | Reflux Ratio |
|---|---|---|---|---|---|
| | | | Extract | Raffinate | |
| 1 | 0.5 | 50 | 83.9% E.C. | 0.7% E.C | |
| 2 | 0.66 | 25 | 0.2% E.C | Less than 0.01% E.C. | |
| 3 | 1.0 | 25 | 87.3% P.C | 0.7% P.C | |
| 4 | | 25 | | | |
| 5 | 0.40 | 25 | 7.5% E.C | 0.0% E.C | |
| 6 | | | | | 4:1 |
| 7 | | | | | 10:1 |
| 8 | 0.40 | 25 | 0.4% P.C | Less than 0.01% P.C. | |
| 9 | | | | | 10:1 |
| 10 | 1.0 | 25 | 0.7% P.C | 94.0% P.C | |
| 11 | | | | | 4:1 |
| 12 | 1.1 | 25 | | | |
| 13 | | | | | 10:1 |
| 14 | 1.1 | 25 | | | |
| 15 | 1.1 | 25 | | | |
| 16 | | | | | 3:1 |
| 17 | | | | | 3:1 |

*Step 11.*—Extract 6 from step 10 is separated into two fractions by distillation in still 25 to separate the added nonaromatic solvent as distillate which is recycled to the nonaromatic solvent reservoir 26 and the Fraction two as a distillation residue which will still be contaminated with a trace of propylene carbonate.

*Step 12.*—The distillation residue from step 11 is extracted with water in extractor 27, the water carrying out the trace of propylene carbonate in extract 7 and Fraction two leaving as raffinate 7.

Step *13.*—Raffinate 7 from step 12 is fractionally distilled in batch still 28 to further separate the components of Fraction two according to the boiling points of the components.

*Step 14.*—Extracts 2 from step 2 and 4 from step 5 are extracted with butylacetate in extractor 29 to remove ethylene carbonate as extract 8 and leave water as raffinate 8 which is recycled to one of the water reservoirs 30.

*Step 15*.—Extracts 5 from step 8 and 7 from step 12 are extracted with butylacetate in extractor 31 to remove propylene carbonate as extract 9 and leave water as raffinate 9 which is recycled to one of the water reservoirs 30.

*Step 16*.—Extract 8 from step 14 is distilled in still 32 to separate butylacetate as a distillate, which is recycled to the butylacetate reservoir 34, and ethylene carbonate as distillation residue which is recycled to the ethylene carbonate reservoir 15.

*Step 17*.—Extract 9 from step 15 is distilled in still 33 to separate butylacetate as a distillate, which is recycled to the butylacetate reservoir 34, and ethylene carbonate as a distillation residue, which is recycled to the ethylene carbonate reservoir 15.

The results that were obtained in Example X will be seen by examining Figures 11 through 14, each of which shows a distillation curve and a refractive index graph of distillation cuts.

Figure 11:
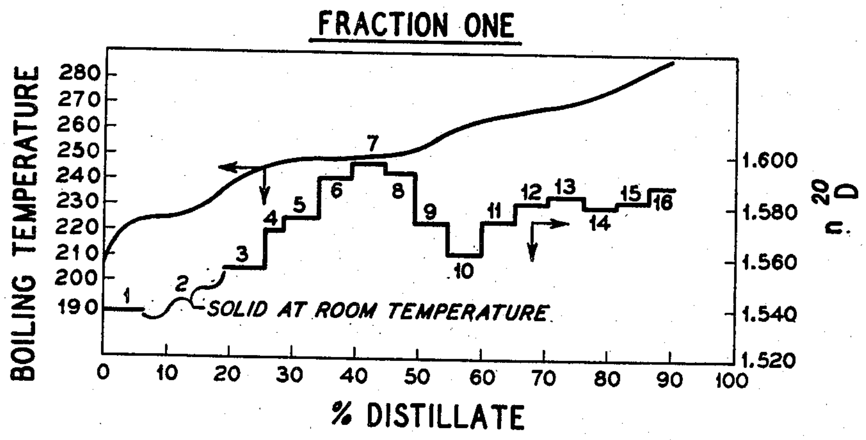
Figure 12:
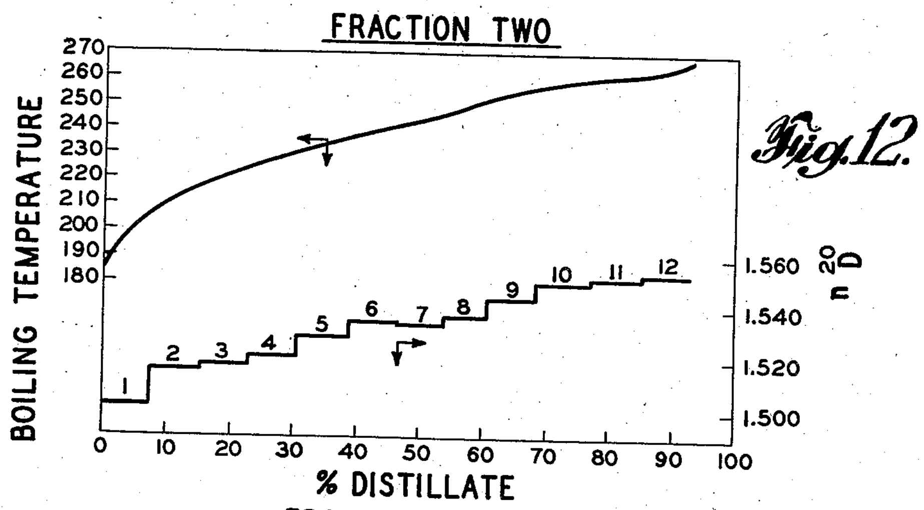

Figure 11 shows a distillation curve and refractive index ($n_D^{20° C.}$) graph for the fractionation of Fraction one in batch still 20. It is to be noted that boiling temperature plateaus were resolved with midpoint temperatures of approximately 215° C., 239° C., and 256° C. and that the refractive index of the cuts were maximal at cuts 7 and 13 while cut 2 was solid at room temperature. These facts indicate the presence of high concentrations of the Fraction one compounds: naphthalene, methylnaphthalenes and higher alkylated naphthalenes. This evidence was corroborated by infrared spectrometric examination of selected distillation cuts from Fraction one distillations. Figure 12 shows a distillation curve and refractive index ($n_D^{20}$) graph for the fractionation of Fraction two in batch still 28. It is to be noted that boiling temperature plateaus are not resolved in this particular instance, and that the refractive index graph of the distillation cuts does not show sharp maxima, both effects indicating that essentially all of the naphthalene, methylnaphthalenes, and higher boiling alkyl naphthalenes were removed as Fraction one and that Fraction two consists of a large number of different substances characterized by refractive indices in the range appropriate for alkylated benzenes of Fraction two.

Figure 13:
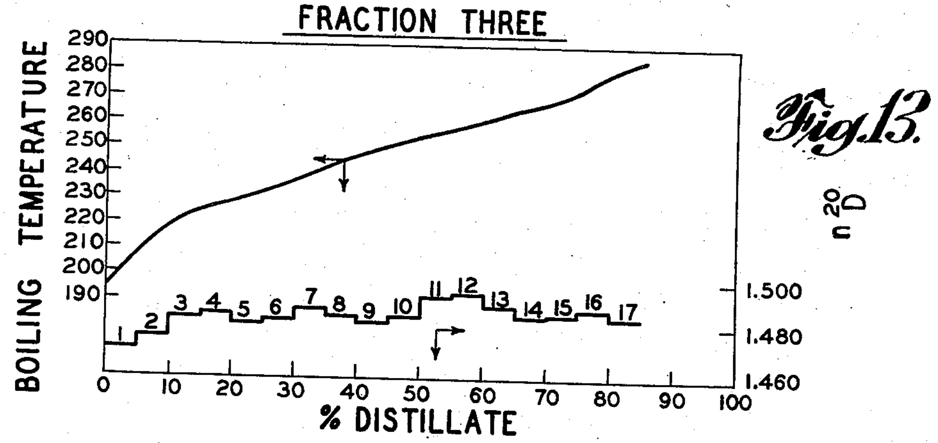

Figure 13 shows the distillation curve and refractive index ($n_D^{20}$) graph for the fractional distillation of Fraction three in batch still 22. These data show that Fraction three is much more nonaromatic in character than either Fraction two or Fraction one, but the data also indicate that Fraction three still contains some aromatic hydrocarbons, which belong to Fraction three. This indication was corroborated by infrared spectrometric studies on distillation cuts from the distillation of Fraction three.

Figure 14:
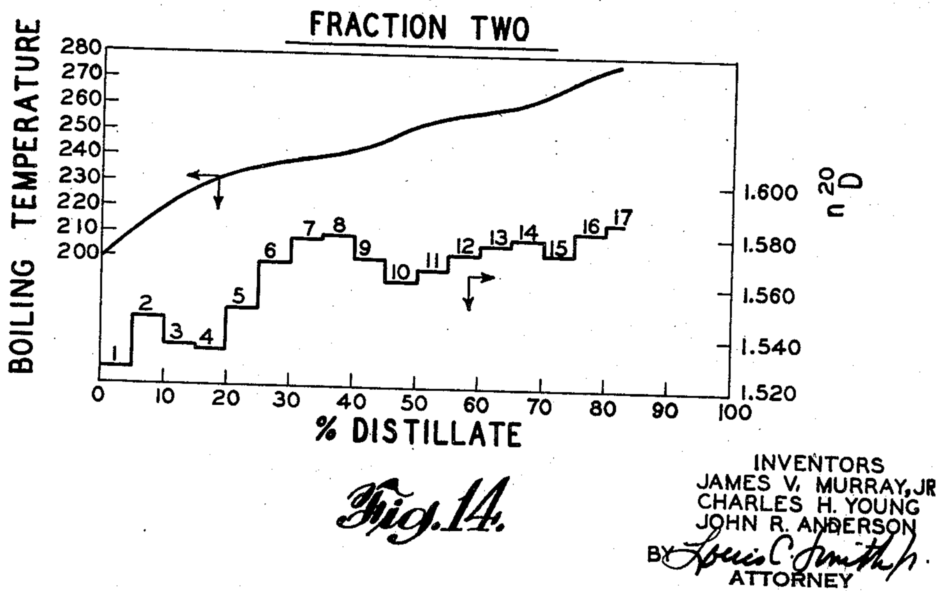

In order to show the effect of using insufficient ethylene carbonate in extractor 11, an extraction was carried out using a feed to solvent ratio of one instead of one-half, raffinate 1 then being treated in the way already shown to get another specimen of Fraction two. The distillation curve and refractive index plot are shown in Figure 14. These data indicate that in this particular instance propylene carbonate extraction removed residual naphthalene, methylnaphthalenes, and higher alkylated naphthalenes, as shown by the refractive index peaks and tendency for plateaus to form.

It can be seen from the above examples that by the method of the invention it is not only possible to separate complex hydrocarbon mixtures into fractions differing in the degree to which their component compounds possess the properties of aromatic compounds but it is also possible to separate one or more compounds of one fraction from one or more compounds of another fraction. For instance, it is possible to use ethylene carbonate to extract one or more compounds of Fraction one from one or more compounds of Fraction two or of Fraction three, or of a mixture of Fractions two and three. In this manner, compounds of Fraction one such as benzene, toluene, naphthalene and the methylnaphthalenes can be separated from compounds of Fraction two, such as tetralin, the alkyl tetralins and the alkyl indanes, or from compounds of Fraction three, such as decalin, cyclohexane, methylcyclohexane, 2,2,3-trimethylpentane and other nonaromatic hydrocarbons.

In such manner propylene carbonate can be used to separate compounds of Fraction one such as benzene and toluene from the aliphatic hydrocarbons of Fraction three. In still another application of individual separation according to the method of the invention, either ethylene carbonate or propylene carbonate may be employed to separate compounds of Fraction two such as tetralin, the alkyl tetralins, the alkyl indanes, methylindanes, aromatic hydrocarbons containing eight carbon atoms, commonly referred to as C8 hydrocarbons, such as the ortho, meta, and para-xylenes and ethylbenzene, and the aromatic hydrocarbons containing nine carbon atoms, commonly referred to as the C9 hydrocarbons, such as normal and isopropylbenzenes, ortho, meta, and para-ethyltoluene, 1,2,3 and 1,2,4 and 1,3,5 trimethylbenzene and indane, from one or more of the compounds of Fraction three. Thus propylene carbonate could also be employed to extract compounds of Fractions one and two together from a mixture with one or more compounds of Fraction three. The choice of solvent and operating conditions for any particular separation can be readily made by one skilled in the art of liquid-liquid extraction.

From the discussion above of the relative miscibilities of the various fractions with the two solvents of the invention, it can be seen that Fraction two, the compounds of which are less aromatic in character than those of Fraction one due to a higher degree of alkylation, is less miscible with both solvents than is Fraction one. Fraction three, the least aromatic of the three is also the least miscible in either solvent. This relationship between miscibility and degree to which compounds are more or less aromatic in character is true within the individual fractions as well as between them though to a lesser degree. For this reason it is possible to employ one of the solvents to make many separations of more aromatic compounds from less aromatic compounds even though both are in the same fraction.

We claim:

1. A process for effecting the substantial separation of a hydrocarbon mixture into three fractions, a Fraction one comprising benzene, alkyl homologs of benzene averaging less than two alkyl carbon atoms per benzene ring, naphthalene and those alkylene homologs of naphthalene boiling below 300° C., a Fraction two comprising essentially alkyl benzene homologs averaging at least two alkyl carbon atoms per benzene ring but not more than four alkyl carbon atoms per benzene ring, alkyl benzene homologs averaging at least two alkyl carbon atoms per benzene ring but a total of not more than five alkyl and cycloalkyl carbon atoms per benzene ring, and alkyl substituted naphthalene homologs boiling above 300° C., and a Fraction three comprising essentially non-aromatic hydrocarbons and the alkyl homologs of benzene having a higher degree of alkylation than those of said Fraction two, which process comprises first extracting said mixture with a 1,2 alkylene carbonate containing from three to four carbon atoms to separate one of said three fractions and then extracting the mixture of two fractions, resulting from said first extraction, with the other of said 1,2 alkylene carbonates to separate one fraction from the other.

2. A process for effecting the substantial separation of a hydrocarbon mixture into three different fractions which comprises extracting said mixture with ethylene carbonate to extract from said mixture substantially all of Fraction one comprising benzene, alkyl homologs of benzene averaging less than two alkyl carbon atoms per benzene ring, naphthalene and those alkyl homologs of naphthalene boiling below 300° C., and leaving as a raffinate a mixture of a Fraction two comprising essentially alkyl benzene homologs averaging at least two alkyl carbon atoms per benzene ring but not more than four alkyl carbon atoms per benzene ring, alkyl benzene homologs averaging at least two alkyl carbon atoms per benzene ring but a total of not more than five alkyl and cycloalkyl carbon atoms per benzene ring, and alkyl substituted naphthalene homologs boiling above 300° C., and a Fraction three comprising essentially nonaromatic hydrocarbons and the alkyl homologs of benzene having a higher degree of alkylation than those of said Fraction two, and then extracting said raffinate with propylene carbonate to extract from said raffinate substantially all of said Fraction two and leaving as a second raffinate said Fraction three.

3. A process for effecting the substantial separation of a hydrocarbon mixture into three different fractions which comprises extracting said mixture with ethylene carbonate at a temperature of 35° to 140° C. to extract from said mixture substantially all of Fraction one comprising benzene, alkyl homologs of benzene averaging less than two alkyl carbon atoms per benzene ring, naphthalene and those alkyl homologs of naphthalene boiling below 300° C., and leaving as a raffinate a mixture of a Fraction two comprising essentially alkyl benzene homologs averaging at least two alkyl carbon atoms per benzene ring but not more than four alkyl carbon atoms per benzene ring, alkyl benzene homologs averaging at least two alkyl carbon atoms per benzene ring but a total of not more than five alkyl and cycloalkyl carbon atoms per benzene ring, and alkyl substituted naphthalene homologs boiling above 300° C., and a Fraction three comprising essentially nonaromatic hydrocarbons and the alkyl homologs of benzene having a higher degree of alkylation than those of said Fraction two, and then extracting said raffinate with propylene carbonate at a temperature of —49° to 140° C. to extract from said raffinate substantially all of said Fraction two and leaving as a second raffinate said Fraction three.

4. A process for effecting the substantial separation of a hydrocarbon mixture into three different fractions which comprises extracting said mixture with ethylene carbonate at a temperature of 35° to 50° C. and at a substantially atmospheric pressure to extract from said mixture substantially all of Fraction one comprising benzene, alkyl homologs of benzene averaging less than two alkyl carbon atoms per benzene ring, naphthalene and those alkyl homologs of naphthalene boiling below 300° C., and leaving as a raffinate a mixture of a Fraction two comprising essentially alkyl benzene homologs averaging at least two alkyl carbon atoms per benzene ring but not more than four alkyl carbon atoms per benzene ring, alkyl benzene homologs averaging at least two alkyl carbon atoms per benzene ring but a total of not more than five alkyl and cycloalkyl carbon atoms per benzene ring, and alkyl substituted naphthalene homologs boiling above 300° C., and a Fraction three comprising essentially nonaromatic hydrocarbons and the alkyl homologs of benzene having a higher degree of alkylation than those of said Fraction two, and then extracting said raffinate with propylene carbonate at a temperature of 20° to 60° C. and at a substantially atmospheric pressure to extract from said raffinate substantially all of said Fraction two and leaving as a second raffinate said Fraction three.

5. A process for effecting the substantial separation of a hydrocarbon mixture which comprises extracting said mixture with propylene carbonate to extract from said mixture substantially all of an extract mixture of a Fraction one comprising benzene, alkyl homologs of benzene averaging less than two alkyl carbon atoms per benzene ring, naphthalene and those alkyl homologs of naphthalene boiling below 300° C., and a Fraction two comprising essentially alkyl benzene homologs averaging at least two alkyl carbon atoms per benzene ring but not more than four alkyl carbon atoms per benzene ring, alkyl benzene homologs averaging at least two alkyl carbon atoms per benzene ring but a total of not more than five alkyl and cycloalkyl carbon atoms per benzene ring, and alkyl substituted naphthalene homologs boiling above 300° C., leaving as a raffinate a Fraction three comprising essentially nonaromatic hydrocarbons and the alkyl homologs of benzene having a higher degree of alkylation than those of said Fraction two, recovering said propylene carbonate from said extract mixture and then extracting said extract mixture with ethylene carbonate to extract said Fraction one therefrom and leave as a raffinate said Fraction two.

6. A process for effecting the substantial separation of a hydrocarbon mixture which comprises extracting said mixture with propylene carbonate at a temperature of —49° to 140° C. to extract from said mixture substantially all of an extract mixture of a Fraction one comprising benzene, alkyl homologs of benzene averaging less than two alkyl carbon atoms per benzene ring, naphthalene and those alkyl homologs of naphthalene boiling below 300° C., and a Fraction two comprising essentially alkyl benzene homologs averaging at least two alkyl carbon atoms per benzene ring but not more than four alkyl carbon atoms per benzene ring, alkyl benzene homologs averaging at least two alkyl carbon atoms per benzene ring but a total of not more than five alkyl and cycloalkyl carbon atoms per benzene ring, and alkyl substituted naphthalene homologs boiling above 300° C., leaving as a raffinate a Fraction three comprising essentially nonaromatic hydrocarbons and the alkyl homologs of benzene having a higher degree of alkylation than those of said Fraction two, recovering said propylene carbonate from said extract mixture and then extracting said extract mixture with ethylene carbonate to extract said Fraction one therefrom and leave as a raffinate said Fraction two.

7. A process for effecting the substantial separation of a hydrocarbon mixture which comprises extracting said mixture with propylene carbonate at a temperature of 20° to 60° C. and at substantially atmospheric pressure to extract from said mixture substantially all of an extract mixture of a Fraction one comprising benzene, alkyl homologs of benzene averaging less than two alkyl carbon atoms per benzene ring, naphthalene and those alkyl homologs of naphthalene boiling below 300° C., and a Fraction two comprising essentially alkyl benzene homologs averaging at least two alkyl carbon atoms per benzene ring but not more than four alkyl carbon atoms per benzene ring, alkyl benzene homologs averaging at least two alkyl carbon atoms per benzene ring but a total of not more than five alkyl and cycloalkyl carbon atoms per benzene ring, and alkyl substituted naphthalene homologs boiling above 300° C., leaving as a raffinate a Fraction three comprising essentially nonaromatic hydrocarbons and the alkyl homologs of benzene having a higher degree of alkylation than those of said Fraction two, recovering said propylene carbonate from said extract mixture and then extracting said extract mixture with ethylene carbonate to extract said Fraction one therefrom and leave as a raffinate said Fraction two.

References Cited in the file of this patent

UNITED STATES PATENTS

| | | |
|---|---|---|
| 2,396,303 | Cummings et al. | Mar. 12, 1946 |
| 2,402,799 | Arnold et al. | June 25, 1946 |
| 2,688,645 | Badertscher et al. | Sept. 7, 1954 |

OTHER REFERENCES

Francis: "Industrial and Engineering Chemistry," vol. 36, pages 1086–1102 (1944), pages 1096–1099 only needed.